(12) United States Patent
Horiuchi et al.

(10) Patent No.: US 7,567,337 B2
(45) Date of Patent: Jul. 28, 2009

(54) LIQUID CRYSTAL LENS AND OPTICAL DEVICE

(75) Inventors: Megumi Horiuchi, Fujiyoshida (JP); Toshiro Yukinari, Fujiyoshida (JP)

(73) Assignee: Citizen Electronics Co., Ltd, Yamanashi-Ken (JP)

( * ) Notice: Subject to any disclaimer, the term of this patent is extended or adjusted under 35 U.S.C. 154(b) by 431 days.

(21) Appl. No.: 11/385,494

(22) Filed: Mar. 21, 2006

(65) Prior Publication Data

US 2006/0215107 A1    Sep. 28, 2006

(30) Foreign Application Priority Data

Mar. 22, 2005    (JP) .............. 2005-081006

(51) Int. Cl.
*G02F 1/133*    (2006.01)
*G02F 1/1347*    (2006.01)
*G02F 1/13*    (2006.01)

(52) U.S. Cl. .............. 349/200; 349/20; 349/74
(58) Field of Classification Search .......... 349/20, 349/74, 200
See application file for complete search history.

(56) References Cited

U.S. PATENT DOCUMENTS 4,795,248 A    1/1989    Okada et al.
5,412,492 A    5/1995    Zammit et al.
5,592,314 A *  1/1997    Ogasawara et al. .......... 349/18
5,683,838 A *  11/1997   Iijima et al. .................. 430/20

FOREIGN PATENT DOCUMENTS

| JP | S63-206721 | | 8/1988 |
| JP | H05-53089 | | 3/1993 |
| JP | 05173153 A | * | 7/1993 |
| JP | H11-194358 | | 7/1999 |
| JP | 2000199908 A | * | 7/2000 |
| JP | 2004-170852 | | 6/2004 |

OTHER PUBLICATIONS

Chinese Office Action issued Mar. 6, 2006 in Chinese application no. 200610068257.6 (with translation), 18 pages.

* cited by examiner

*Primary Examiner*—Julie Ngo
(74) *Attorney, Agent, or Firm*—Brinks Hofer Gilson & Lione (57) ABSTRACT

A liquid crystal lens comprises a first liquid crystal lens part. The first liquid crystal part comprises first and second flat parallel substrates and a liquid crystal filled between said first and second light-transmitting regions. First and second electrodes are provided on said first and second substrates, respectively, to apply a voltage across the first liquid crystal. An electric heating element is provided on said first substrate to heat said first liquid crystal.

9 Claims, 8 Drawing Sheets

LIQUID CRYSTAL LENS AND OPTICAL DEVICE

This application claims priority under 35 U.S.C. § 119 to Japanese Patent Application No. 2005-081006 filed Mar. 22, 2005, the entire content of which is hereby incorporated by reference.

BACKGROUND OF THE INVENTION

The present invention relates to a liquid crystal lens comprising a pair of transparent substrates, a liquid crystal filled between the transparent substrates and electrodes mounted to the transparent substrates, in which a voltage is applied to the electrodes to change the refractive index of the liquid crystal, thereby changing the focal length.

DESCRIPTION OF THE BACKGROUND ART

It has been proposed to use a liquid crystal lens as a variable-focus lens of a focusing mechanism used in cameras, optical disk devices, etc.

One example of conventional liquid crystal lenses has a pair of transparent substrates opposed to each other in the form of a lens as a whole. A liquid crystal is sealed between the transparent substrates. Transparent electrodes are provided on the transparent substrates. The refractive index of the liquid crystal is varied by adjusting the voltage applied to the electrodes [for example, see Japanese Patent Application Publication No. Sho 63-206721].

Another example of conventional liquid crystal lenses is a planar liquid crystal lens that includes a pair of flat transparent substrates and transparent electrodes provided on the mutually opposing inner surfaces of the transparent substrates. At least one of the transparent electrodes comprises a plurality of concentric electrodes provided concentrically about the optical axis of the liquid crystal lens. A liquid crystal is sealed in a flat space between the substrates. Voltages applied to the transparent concentric electrodes are varied to produce a voltage distribution varying radially of the liquid crystal, thereby enabling the refractive index of the liquid crystal to be varied [for example, see Japanese Patent Application Publication (KOKAI) No. Hei 5-53089].

There has also been proposed a technique based on the notice that a liquid crystal panel used in a display device degrades in operating characteristics at low temperature, although this is not concerned with a liquid crystal lens. According to the proposed technique, an electric heating element is provided on the liquid crystal panel to enable the panel to be heated at low temperature [for example, see Japanese Patent Application Publication No. 2004-170852].

The present inventor has proposed a technique of forming an electric heating element on a glass substrate of a liquid crystal panel [for example, see Japanese Patent Application Publication No. Hei 11-194358].

To apply a liquid crystal lens to the zooming function or focusing function of a camera, the variable range of the focal length needs to be widened. For this purpose, it is necessary to make the refractive index of the liquid crystal lens variable to a considerable extent.

To widen the refractive index variable range of a planar liquid crystal lens, it is necessary to increase the refractive index anisotropy ($\Delta n$) of the liquid crystal material used in the liquid crystal lens or to increase the distance (d) between the substrates. There is, however, a limit to increasing the refractive index anisotropy of the liquid crystal material. Ordinary liquid crystal materials have a refractive index anisotropy $\Delta n$ of 0.4 or less. Accordingly, it is necessary in order to obtain desired refractive index changes to increase the distance (d) between the substrates. In this regard, the speed of rising or falling response of the liquid crystal lens to the application of the driving voltage decreases in proportion to the square of the distance (d) between the substrates.

Meanwhile, when a liquid crystal lens is used as a focusing mechanism of a camera, a response speed of 2 seconds or less is required.

Figure 14:
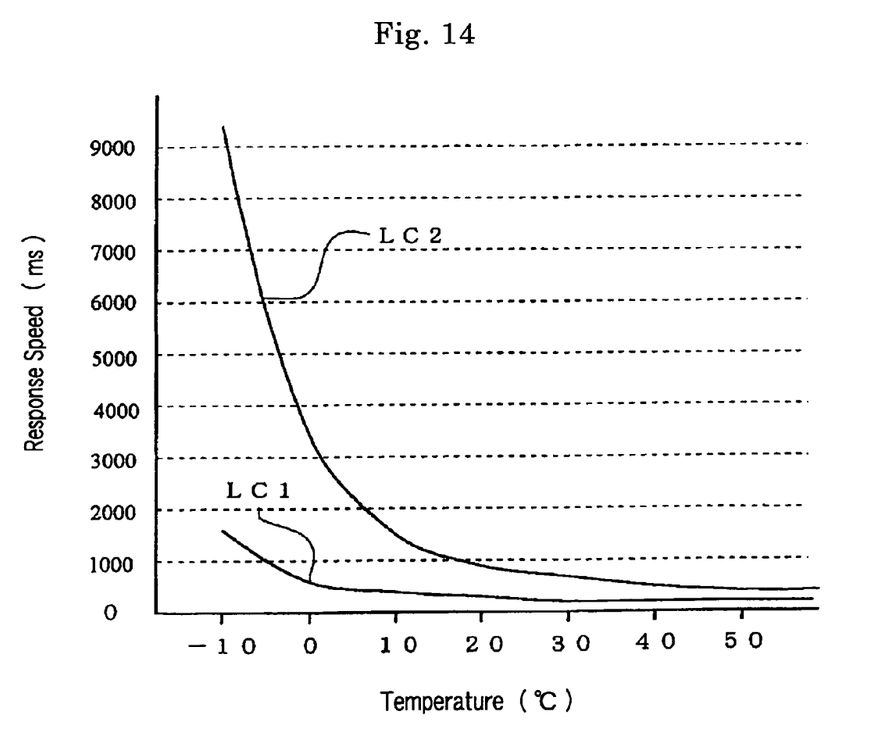
FIG. 14 is a graph showing the temperature-response speed characteristics of a conventional liquid crystal cell and a liquid crystal cell for a lens.

FIG. 14 shows the response speed characteristics $LC_1$ and $LC_2$ of a liquid crystal when a driving voltage was applied across the liquid crystal in two different cases where the distance (d) between substrates sandwiching the liquid crystal was 10 μm and 25 μm. As will be clear from the graph of FIG. 14, when the substrate distance (d) is 10 μm ($LC_1$), the response speed is not more than 2000 ms even at −10° C., whereas when the substrate distance (d) is 25 μm ($LC_2$), the response speed exceeds 2000 ms even at 5° C.

In other words, a liquid crystal lens having an increased substrate distance (d) so as to be used in a camera will not be able to satisfy the required function as stated above.

As will be understood from the above, a contradictory problem arises in using a liquid crystal lens to implement a focusing mechanism of a camera. That is, an increased substrate distance (d) is needed in order to increase the focusing range, and the response speed decreases as the substrate distance (d) is increased. None of existing liquid crystal lenses has found an effective solution to this problem. A focusing mechanism of a camera using a liquid crystal lens has not yet been put to practical use.

BRIEF SUMMARY

Accordingly, an object of the present invention is to solve the problem of degradation of the response speed due to the inter-substrate distance (d) which is increased to give large refractive index changes, thereby realizing a liquid crystal lens responding at high speed and having a wide focusing range.

The present invention provides a liquid crystal lens including a first liquid crystal lens part. The first liquid crystal lens part includes a first substrate having a first light-transmitting region and a second substrate having a second light-transmitting region opposed to the first light-transmitting region. A first liquid crystal is filled between the first and second light-transmitting regions. First and second electrodes are provided on the first and second substrates, respectively, to apply a voltage across the first liquid crystal between the first and second substrates. An electric heating element is provided on the first substrate to heat the first liquid crystal.

In the liquid crystal lens, when the temperature of the liquid crystal is low, the electric heating element is driven to raise the temperature of the liquid crystal, thereby preventing a reduction in response speed of the liquid crystal.

More specifically, the electric heating element may be provided on a surface of the first substrate on the side thereof facing the first liquid crystal in order to effectively heat the first liquid crystal.

The first electrode may be provided on one of a surface of the first substrate facing the first liquid crystal and a surface of the first substrate facing away from the first liquid crystal, and the electric heating element is provided on the other of these surfaces. With this arrangement, it becomes possible to design the size and configuration of the electric heating element relatively freely.

For example, the electric heating element may be a transparent element that is positioned in the first light-transmitting region of the first substrate. Specifically, the electric heating element may have the shape of a plane. Further, the electric heating element may have a plurality of elongated electric heating element portions spaced apart from each other and crossing the first light-transmitting region. Further, the electric heating element may be an opaque element that is positioned in the first light-transmitting region in a configuration not interfering with the lens function of the liquid crystal lens. As a specific configuration thereof, the electric heating element may have an elongated electric heating element portion crossing the first light-transmitting region.

The electric heating element may be an opaque element that is positioned outside the first light-transmitting region of the first substrate.

The electric heating element may be formed from a high-electric resistance portion and a low-electric resistance portion that are alternately connected to each other.

In addition, the present invention provides a liquid crystal lens including a second liquid crystal lens part in addition to the above-described first liquid crystal lens part. The second liquid crystal lens part includes a third substrate having a third light-transmitting region opposed to the first light-transmitting region and a fourth substrate disposed at a side of the third substrate remote from the first substrate. The fourth substrate has a fourth light-transmitting region opposed to the third light-transmitting region. A second liquid crystal is filled between the third and fourth light-transmitting regions. Third and fourth electrodes are provided on the third and fourth substrates, respectively, to apply a voltage across the second liquid crystal. The first and second liquid crystal lens parts are arranged so that the respective orientations of the first and second liquid crystals are orthogonal to each other. The so arranged first and second liquid crystal lens parts will cancel polarization of light passing which will be generated when the light passes a single liquid crystal lens part.

The first substrate and the third substrate may be bonded together with an adhesive. The first substrate may be arranged to serve also as the third substrate.

The first substrate may have a first extension portion extending outward relative to the second substrate, and at least one of a connecting terminal for external connection of the electric heating element and a connecting terminal for external connection of the first electrode may be provided on the outer surface of the first extension portion.

The third substrate may have a second extension portion extending outward relative to the fourth substrate, and a connecting terminal for external connection of the third electrode may be provided on the outer surface of the second extension portion.

In addition, the present invention provides an optical device including a housing having an aperture for receiving incident light, and the above-described liquid crystal lens that is set in an optical system along an optical axis extending into the housing through the aperture of the housing. In the optical device, the second liquid crystal lens part and the first liquid crystal lens part are disposed along the optical axis so that the fourth substrate is positioned to face the aperture.

If the first liquid crystal lens part is positioned closer to the aperture of the housing, heat from the electric heating element provided in the first liquid crystal lens part is likely to leak to the outside through the aperture. If the liquid crystal lens is arranged as stated above, however, heat from the electric heating element provided in the first liquid crystal lens part heats the second liquid crystal of the second liquid crystal lens part even if the heat leaks to the outside through the aperture. Therefore, it becomes possible to efficiently heat the first and second liquid crystals in the liquid crystal lens.

As has been stated above, it is possible according to the present invention to realize a liquid crystal lens device having a wide focusing range and responding at high speed.

Other objects and advantages of the present invention will become apparent from the following detailed description of illustrated embodiments of the invention.

DETAILED DESCRIPTION OF THE PREFERRED EMBODIMENTS

Embodiments of the present invention will be described below in detail with reference to the accompanying drawings.

Figure 1:
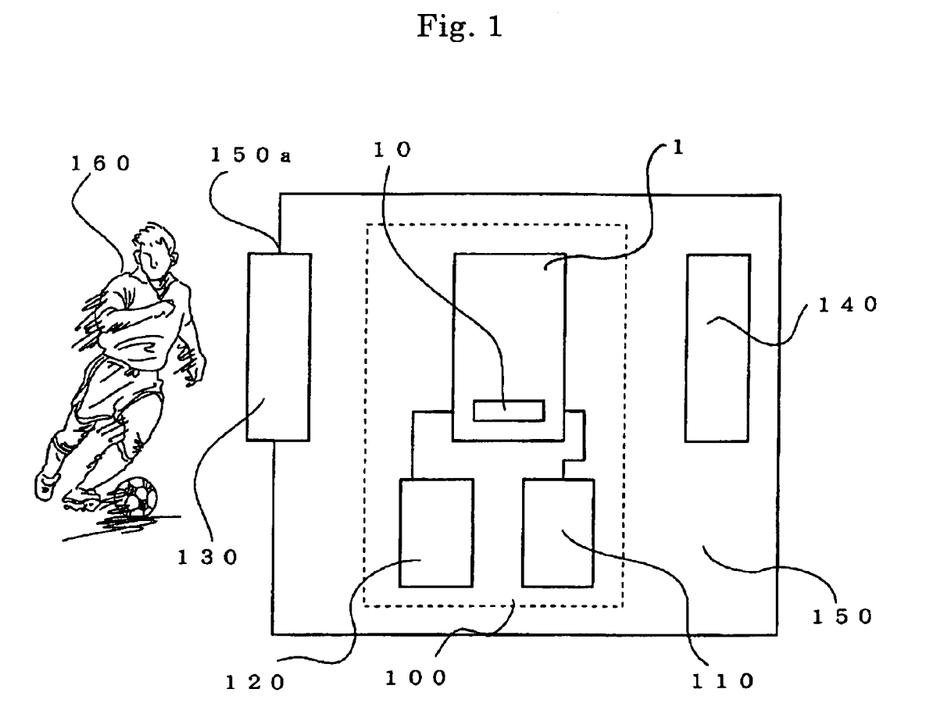
FIG. 1 is a block diagram of a camera incorporating a liquid crystal lens device according to the present invention.

FIG. 1 is a block diagram showing a camera incorporating a liquid crystal lens device 100 according to the present invention.

As illustrated in the figure, the liquid crystal lens device 100 includes a liquid crystal lens 1 having an electric heating element 10 (described later), a liquid-crystal driving circuit 110, and a heater-driving power supply 120 that drives the electric heating element 10. The liquid crystal lens device 100 is accommodated in a housing 150, together with optical lenses 130 and 140. The liquid crystal lens 1 and the optical lenses 130 and 140 are disposed along an optical axis. FIG. 1 shows a state where the camera is pointed at an object 160.

Figure 2:
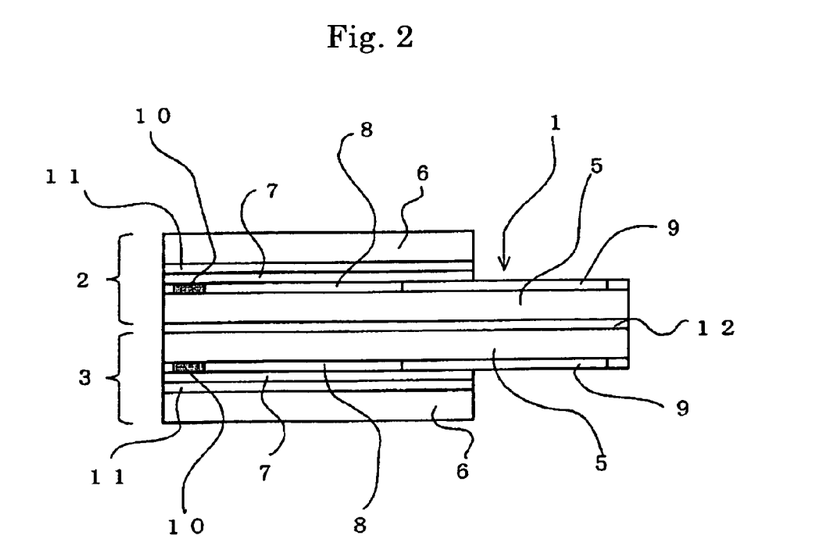
FIG. 2 is a sectional view of a liquid crystal lens showing a first embodiment of the present invention.
Figure 3:
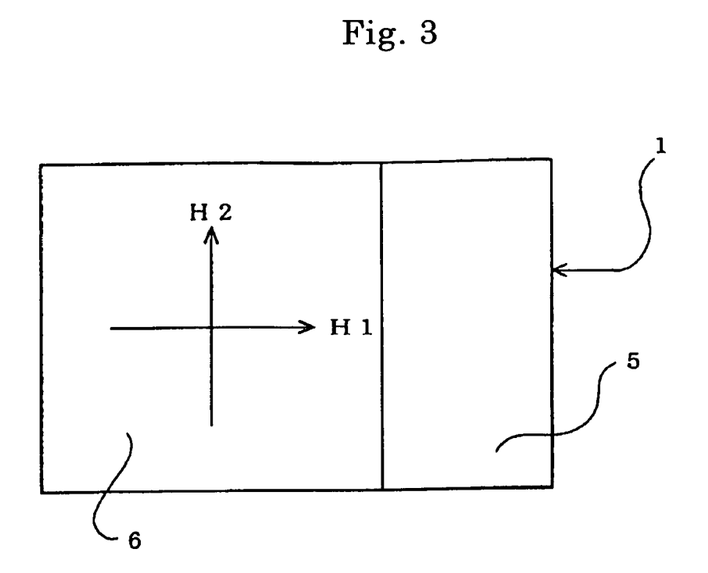
FIG. 3 is a plan view of the liquid crystal lens showing the first embodiment of the present invention.

FIG. 2 is a sectional view of the liquid crystal lens 1 shown in FIG. 1. FIG. 3 is a plan view of the liquid crystal lens 1.

As illustrated in the figures, the liquid crystal lens 1 has a first liquid crystal lens part 2 and a second liquid crystal lens part 3, which are bonded together with a UV bonding layer 12. The first and second liquid crystal lens parts 2 and 3 are of the same basic structure and each have a transparent first substrate 5 and a transparent second substrate 6, which are opposed to each other, and a liquid crystal layer 7 formed between the first and second substrates 5 and 6. The "first substrate 5" and the "second substrate 6" of the second liquid crystal lens part 3 correspond to "third substrate" and "fourth substrate" defined in claims attached to this specification, respectively. As can be seen from FIGS. 2 and 4, the first substrate 5 has on a surface thereof closer to the liquid crystal layer 7 a liquid-crystal driving transparent concentric electrode assembly 8 and an electric heating element 10 disposed around the concentric electrode assembly 8. The concentric electrode assembly 8 has a center electrode 8a and a plurality of annular electrodes 8b concentrically disposed around the center electrode 8a. The center electrode 8a and the annular electrodes 8b are connected together with a resistance wire 15. Connecting terminals 9a and 9b are connected to the center electrode 8a and the outer ends of the resistance wire 15, respectively. Connecting terminals 9c and 9d are connected to both ends of the electric heating element 10. The first substrate 5 is further provided on its surface closer to the liquid crystal layer 7 with a connecting terminal 9e connected to a liquid-crystal driving common electrode 11 (see FIG. 5) provided on the second substrate 6 through an inter-substrate conducting via 11a. Both the liquid-crystal driving concentric electrode assembly 8 and the common electrode 11 are transparent electrodes made of ITO (indium tin oxide) or the like. The electric heating element 10 need not be transparent because it is provided outside the lens area. A metallic material of good electrical conductivity, e.g. gold, is used for the electric heating element 10.

As shown in FIG. 3, the liquid crystal layers 7 of the first and second liquid crystal lens parts 2 and 3 are each uniformly oriented and arranged so that their respective orientations H1 and H2 are orthogonal to each other. The reason for this is as follows. As disclosed in the above-mentioned Japanese Patent Application Publication No. Hei 5-53089, although a single liquid crystal, which is uniformly oriented, can bring about the maximum change in refractive index thereof, the degree of polarization of light passing through the liquid crystal increases. Therefore, by orienting the two liquid crystal layers 7 as stated above, polarization of the light caused by one liquid crystal is canceled by that caused by the other liquid crystal, thereby allowing an appropriate focusing operation to be performed over a wide range.

Figure 4:
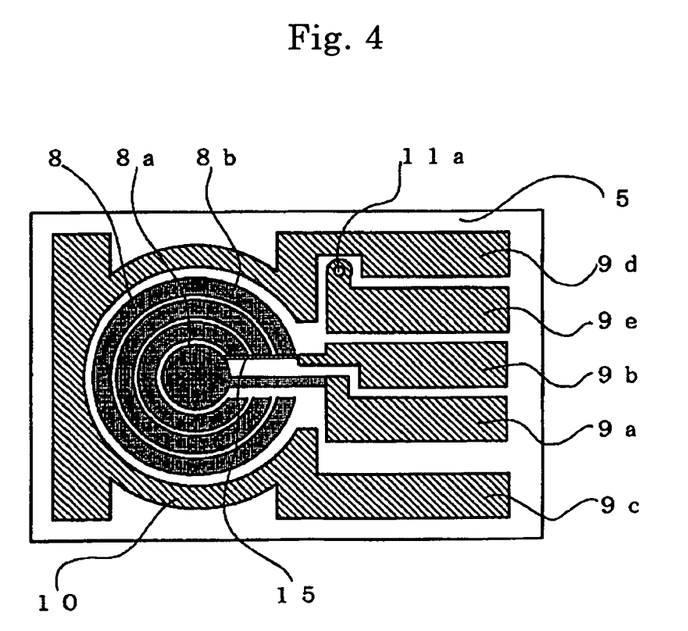
FIG. 4 is a diagram illustrating electrode patterns on a first substrate shown in FIG. 2.
Figure 5:
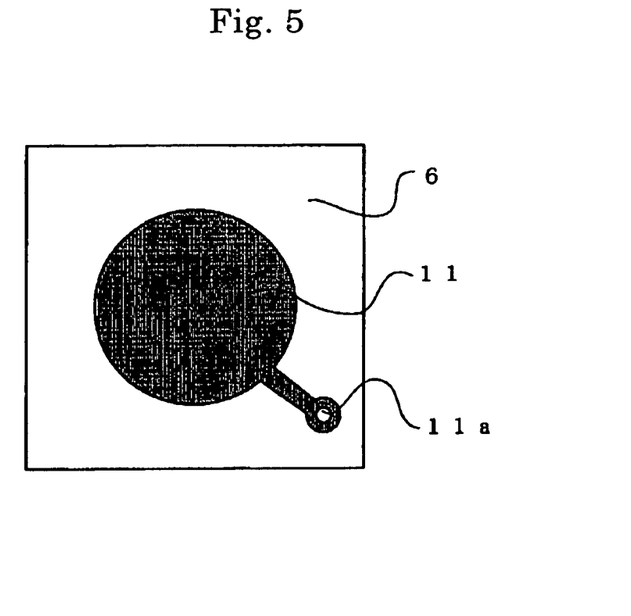
FIG. 5 is a diagram illustrating electrode patterns on a second substrate shown in FIG. 2.

In the liquid crystal lens 1, a liquid-crystal driving voltage signal is applied from the liquid-crystal driving circuit 110 through the connecting terminals 9a and 9b. Consequently, different electric potentials are applied to the center electrode 8a and each annular electrode 8b, respectively. As a result, a radially varying voltage distribution is produced on the liquid crystal layer 7 between the concentric electrode assembly 8 and the common electrode 11, whereby the refractive index of the liquid crystal layer 7 is controlled to implement a variable focus function.

The heater-driving power supply 120 heats the liquid crystal layer 7 with the electric heating element 10 when the temperature of the liquid crystal layer 7 is lower than a predetermined level, thereby maintaining the desired response speed of the liquid crystal layer 7.

Figure 6:
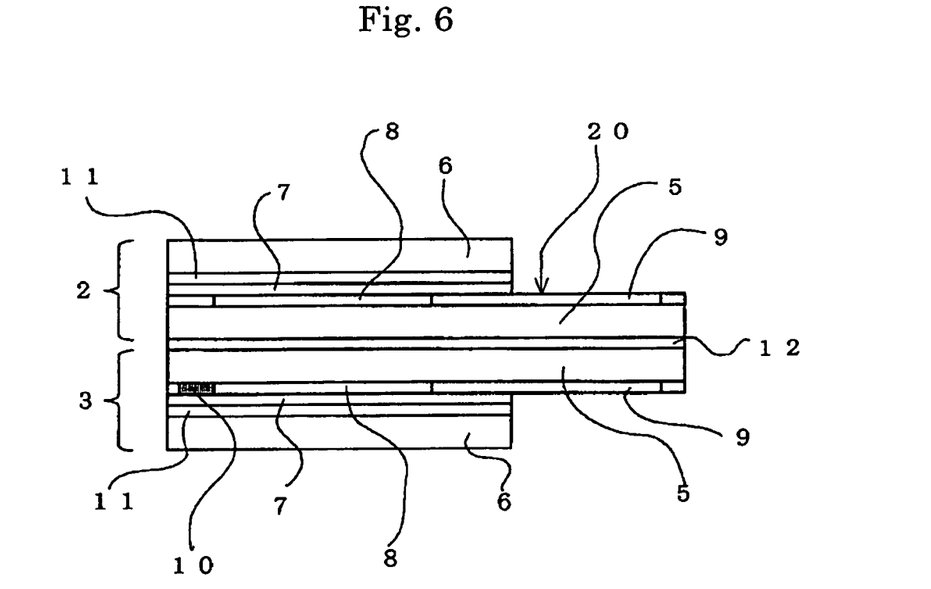
FIG. 6 is a sectional view of a liquid crystal lens showing a second embodiment of the present invention.

FIG. 6 is a sectional view of a liquid crystal lens showing a second embodiment of the present invention. In FIG. 6, the same constituent elements as those in the sectional view of the liquid crystal lens shown in FIG. 2 are denoted by the same reference numerals, and a description thereof is omitted.

The liquid crystal lens 20 shown in FIG. 6 differs from the liquid crystal lens 1 in FIG. 2 in that an electric heating element 10 is provided only in the second liquid crystal lens part 3, and no electric heating element is provided in the first liquid crystal lens part 2.

We conducted an experiment to measure temperature characteristics regarding a liquid crystal layer 7 of a liquid crystal lens having a two-layer structure consisting essentially of first and second liquid crystal lens parts 2 and 3. In the experiment, the liquid crystal lens was placed so that the first liquid crystal lens part 2 was positioned at the side of the housing 150 closer to the aperture 150a thereof, i.e. on the incident light side. The experiment revealed that a system in which an electric heating element 10 is provided only in the second liquid crystal lens part 3 as shown in FIG. 6 is superior to a system in which an electric heating element 10 is provided only in the first liquid crystal lens part 2, and not so inferior to a system in which electric heating elements 10 are provided in both the first and second liquid crystal lens parts 2 and 3 as shown in FIG. 2.

Figure 13:
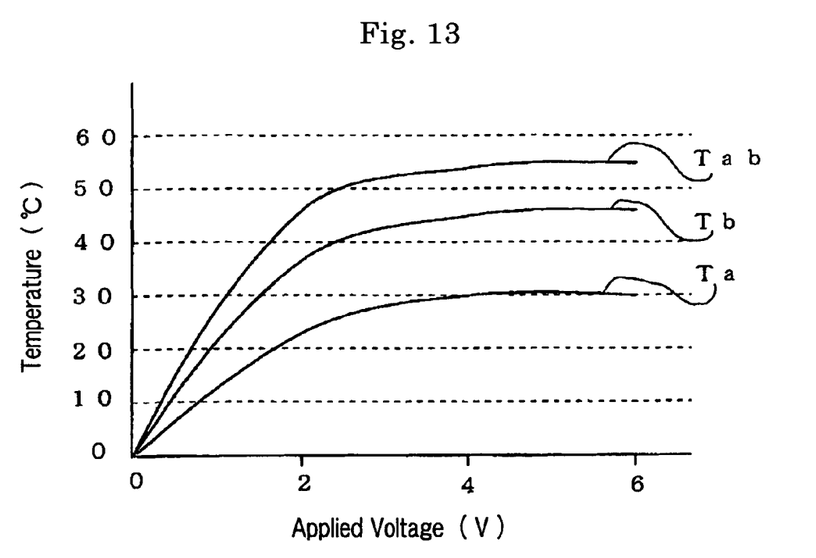
FIG. 13 is a graph showing the temperature characteristics of a liquid crystal cell when heated with different electric heating element arrangements.

FIG. 13 is a temperature characteristic chart showing the rise in temperature of each liquid crystal lens part caused by heating with an electric heating element 10. The abscissa axis represents the voltage applied to the electric heating element 10 from the heater-driving power supply 120. The ordinate axis represents the temperature of each liquid crystal lens part.

In FIG. 13, $T_{ab}$ denotes temperature characteristics showing temperature rise upon heating with electric heating elements 10 provided in both the first liquid crystal lens part 2 and the second liquid crystal lens part 3. $T_a$ denotes temperature characteristics showing temperature rise upon heating with an electric heating element 10 provided only in the first liquid crystal lens part 2. $T_b$ denotes temperature characteristics showing temperature rise upon heating with an electric heating element 10 provided only in the second liquid crystal lens part 3. Because the first liquid crystal lens part 2 and the second liquid crystal lens part 3 were integrated by the UV bonding layer 12 of good thermal conductivity, the first and second liquid crystal lens parts 2 and 3 were held at substantially the same temperature irrespective of the heating system. It is a matter of course that $T_a$ and $T_b$ are lower in temperature than $T_{ab}$, but it was revealed that there is a difference in temperature between $T_a$ and $T_b$.

The reason for the temperature difference was found to be due to the fact that heat from the heated liquid crystal lens is dissipated to the outside through the optical lens 130 provided at the aperture 150a (incident light side) of the housing 150. That is, when an electric heating element 10 is provided only in the first liquid crystal lens part 2, which is closer to the aperture 150a (incident light side) of the housing 150, to effect heating, heat from the first liquid crystal lens part 2 is dissipated directly to the outside through the optical lens 130 at the aperture 150a. Therefore, heat transfer to the second liquid crystal lens part 3 cannot be sufficiently performed, resulting in only a low temperature being obtained. In contrast, when an electric heating element 10 is provided only in the second liquid crystal lens part 3, heat from the second liquid crystal lens part 3 is dissipated to the outside through the optical lens 130 after passing through the first liquid crystal lens part 2. Accordingly, heat transfer from the second liquid crystal lens part 3 to the first liquid crystal lens part 2 can be sufficiently performed, and heat generated from the electric heating element 10 can be used effectively.

In other words, there is no great difference in temperature characteristics between two systems: one in which an electric heating element 10 is provided only in a second liquid crystal lens part 3 of a liquid crystal lens having a two-layer structure in which two liquid crystal lens parts 2 and 3 are integrated by a UV bonding layer 12, as shown in FIG. 6; and the other in which electric heating elements 10 are provided in both the liquid crystal lens parts 2 and 3. Moreover, since the system shown in FIG. 6 needs to provide a single electric heating element 10, this system is simplified in structure and advantageous in terms of costs.

Figure 7:
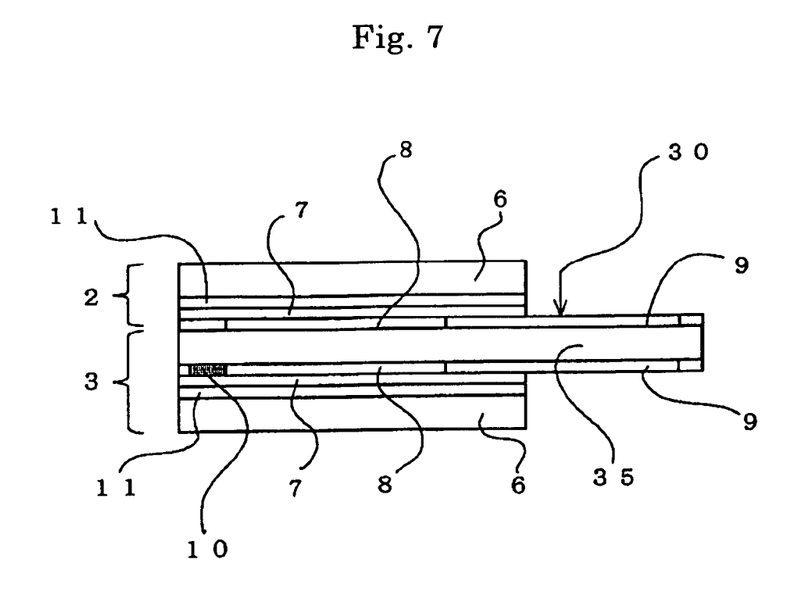
FIG. 7 is a sectional view of a liquid crystal lens showing a third embodiment of the present invention.

FIG. 7 is a sectional view of a liquid crystal lens showing a third embodiment of the present invention. In FIG. 7, the same constituent elements as those of the liquid crystal lens shown in FIG. 2 are denoted by the same reference numerals, and a description thereof is omitted.

The liquid crystal lens 30 shown in FIG. 7 differs from the liquid crystal lens 1 in FIG. 2 in that a single common substrate 35 is provided in place of the first substrates 5 provided in the respective liquid crystal lens parts 2 and 3 of the liquid crystal lens 1.

In the liquid crystal lens 30, liquid-crystal driving concentric electrode assemblies 8 as shown in FIG. 4 are provided on both sides of the common substrate 35, and an electric heating element 10 is provided only on a surface of the common substrate 35 on the side thereof closer to the second liquid crystal lens part 3 (i.e. the lower side of the common substrate 35 as viewed in the figure). It should be noted that another electric heating element 10 may be provided on the side of the common substrate 35 closer to the first liquid crystal lens part 2. In this regard, however, the required heating characteristics can be obtained with an electric heating element 10 provided only in the second liquid crystal lens part 3, as has been stated with regard to the liquid crystal lens 20 shown in FIG. 6. Moreover, in the liquid crystal lens 30, only a single substrate is present between the first liquid crystal lens part 2 and the second liquid crystal lens part 3. Therefore, heat conductivity from the second liquid crystal lens part 3 to the first liquid crystal lens part 2 is good, and it is possible to expect favorable heating characteristics than from the liquid crystal lens 20 shown in FIG. 6.

Figure 8:
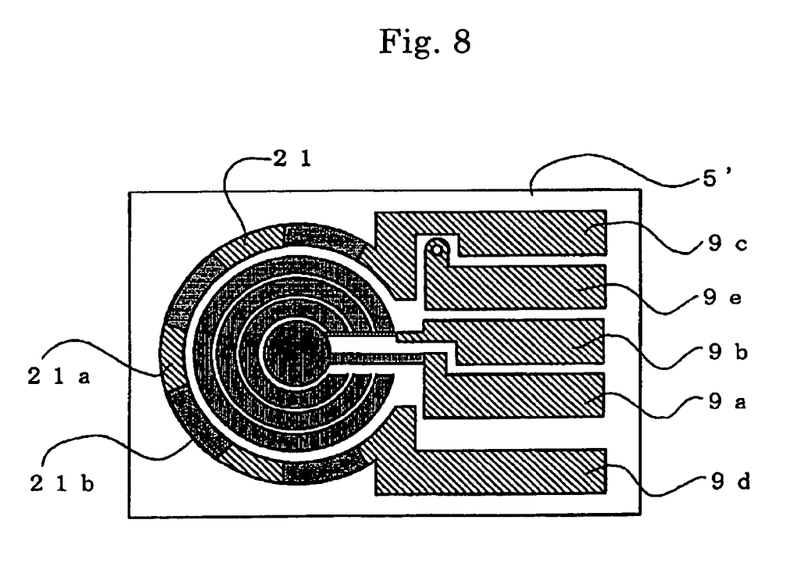
FIG. 8 shows a modification of the electrode patterns on a first substrate shown in FIG. 4.

FIG. 8 is a pattern diagram of an electric heating element 21 and a liquid-crystal driving concentric electrode assembly 8 on a first substrate 5', which shows another embodiment of the electric heating element. In FIG. 8, the same constituent elements as those shown in FIG. 4 are denoted by the same reference numerals, and a description thereof is omitted.

The first substrate 5' shown in FIG. 8 differs from the first substrate 5 in FIG. 4 in that the electric heating element 21 is not made of gold in its entirety but formed from a combination of a gold portion 21a (opaque heater portion) and an ITO portion 21b (transparent heat portion) that are provided alternately.

The electric heating element 21 can be formed by the method proposed by the present inventor in Japanese Patent Application Publication No. Hei 11-194358. That is, first, an ITO film is formed on the upper surface of the first substrate 5'. Then, a paste is prepared by mixing an oxidative resin with gold powder dispersed in an organic solvent. The paste is printed on necessary portions on the ITO film (corresponding to the connecting terminals 9a-9e and the gold portions 21a of the electric heating element 21) by using a screen printing machine to form a gold paste printed film. Next, the first substrate 5' is heated to about 500° C. in a kiln to completely evaporate the resin content in the gold paste printed film. As a result, only gold remains, and a gold film is baked on the surface of the ITO film. The gold film forms the connecting terminals 9a to 9e and the gold portions 21a of the electric heating element 21.

Next, a positive photoresist film is formed by screen printing over the whole surface where the gold film and the ITO film are exposed. Then, patterning is performed by ultraviolet-light irradiation using a photomask having a wiring pattern configuration. The first substrate 5' having the patterned photoresist film is then dipped in a gold etching solution to remove undesired portions of the gold film. This etching step removes excess portions of the connecting terminals 9a to 9e and the gold portions 21a of the electric heating element 21, thereby shaping them to the desired patterns. Subsequently, with desired masking applied thereto, the first substrate 5' is dipped in an ITO etching solution to form the center electrode 8a and annular electrodes 8b of the liquid-crystal driving concentric electrode assembly 8 and the ITO portions 21b of the electric heating element 21. After this etching step, the first substrate 5' is dipped in a remover to remove the masking film remaining on the surface layer. Thus, the pattern forming step for the first substrate 5' is completed.

An electric heating element suitable for particular heating conditions can be obtained by appropriately combining together the ITO portions 21b (high-resistance portions, or high-heat generation portions) and the gold portions 21a (low-resistance portions, or low-heat generation portions) of the electric heating element 21. Because the ITO electrode portion as a heat-generating portion is divided so as to be dispersed as ITO portions 21b, the electrode width of each ITO portion 21b can be made relatively wide. As a result, diffusion of heat is enhanced, and the electrodes become difficult to separate.

The following advantages are obtained by forming the gold portions of the electric heating element using the method disclosed in the above-mentioned Japanese Patent Application Publication No. Hei 11-194358.

In a case where the electric heating element is provided in the liquid crystal lens part to increase the heating efficiency, in particular, stability of metal becomes a matter of concern because the metal constituting the electric heating element and the liquid crystal material are in direct contact with each other. In such a case, the gold portions formed by the above-described method are stable. Therefore, there is no deterioration due to a chemical reaction even if the gold portions are in direct contact with the liquid crystal material.

In addition, the gold portions formed by the above-described method have good adhesion to the ITO film and the glass substrate and are therefore unlikely to separate on heating.

The combined process of the above-described method and photoetching process enables formation of fine patterns for an electric heating element. Therefore, the combined process facilitates the control of the value of resistance, which is an important factor of the electric heating element, and it becomes possible to produce a high-performance liquid crystal lens.

Figure 9:
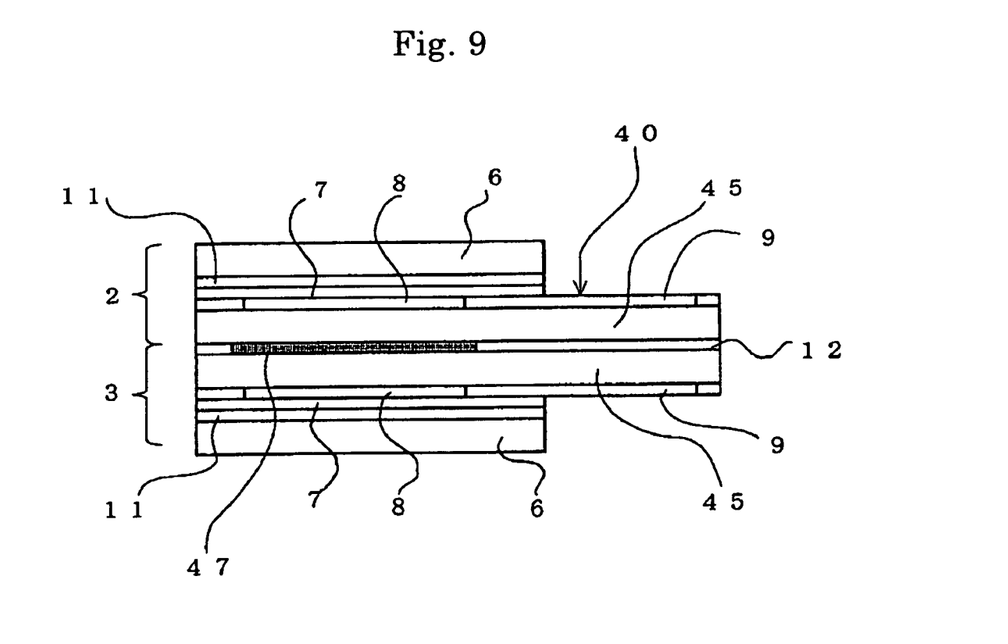
FIG. 9 is a sectional view of a liquid crystal lens showing a fourth embodiment of the present invention.

FIG. 9 is a sectional view of a liquid crystal lens showing a fourth embodiment of the present invention. In FIG. 9, the same constituent elements as those in the sectional view of the liquid crystal lens shown in FIG. 2 are denoted by the same reference numerals, and a description thereof is omitted.

The liquid crystal lens 40 shown in FIG. 9 differs from the liquid crystal lens 1 in FIG. 2 in that an electric heating element is formed in the middle between the first liquid crystal lens part 2 and the second liquid crystal lens part 3, i.e. between first substrates 45.

In production of the liquid crystal lens 40, first, an electric heating element 47 is formed on either of the first substrates 45 of the first and second liquid crystal lens parts 2 and 3. Then, the first and second liquid crystal lens parts 2 and 3 are integrated by an UV bonding layer 12 with the electric heating element 47 interposed between the first substrates 45.

Figure 10:
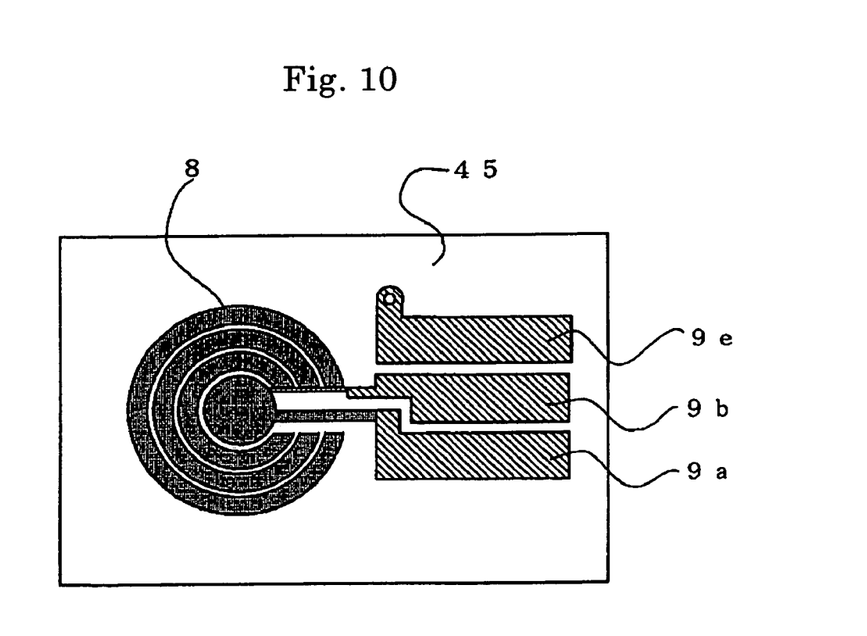
FIG. 10 is a diagram illustrating electrode patterns on the inner surface of a first substrate shown in FIG. 9.
Figure 11:
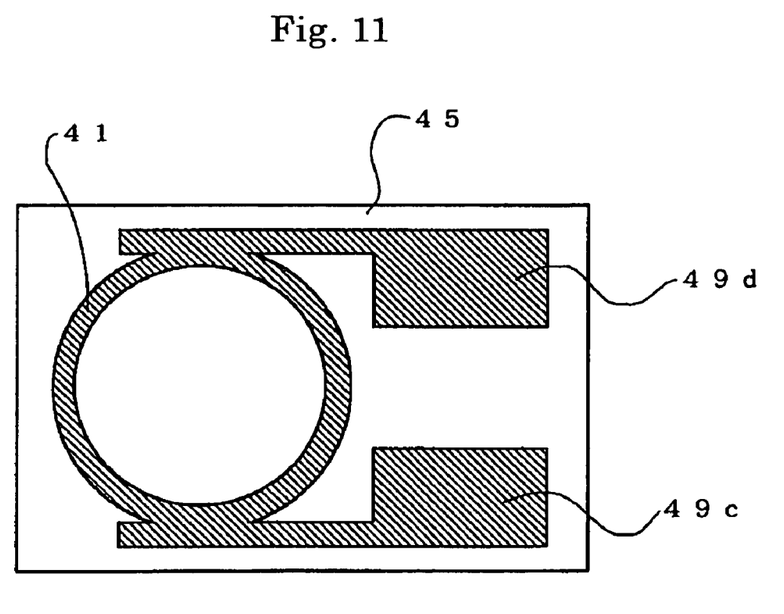
FIG. 11 is a diagram illustrating electrode patterns on the outer surface of the first substrate shown in FIG. 9.

FIG. 10 shows the inner side of the first substrate 45 in each of the first and second liquid crystal lens parts 2 and 3 of the liquid crystal lens 40 (i.e. the side of the first substrate 45 that faces the liquid crystal layer 7 in each of the first and second liquid crystal lens parts 2 and 3). FIG. 11 shows the outer side of the first substrate 45 of the first liquid crystal lens part 2 (i.e. the side of the first substrate 45 that faces the second liquid crystal lens part 3). As shown in FIG. 10, the inner side of the first substrate 45 of each of the first and second liquid crystal lens parts 2 and 3 is provided with a liquid-crystal driving concentric electrode assembly 8, connecting terminals 9a and 9b thereof, and one connecting terminal 9e connected to a common electrode 11 provided on the corresponding second substrate. As shown in FIG. 11, an electric heating element 41 and connecting terminals 49c and 49d thereof are provided only on the outer side of the first substrate 45 of the first liquid crystal lens part 2.

It should be noted that external connection of the connecting terminals 49c and 49d may be made by leading them out directly from the outer peripheral surface of the first substrate 45. It is also possible to provide vias in the first substrate 45 to lead out the connecting terminals 49c and 49d to the inner side of the first substrate 45.

Figure 12A:
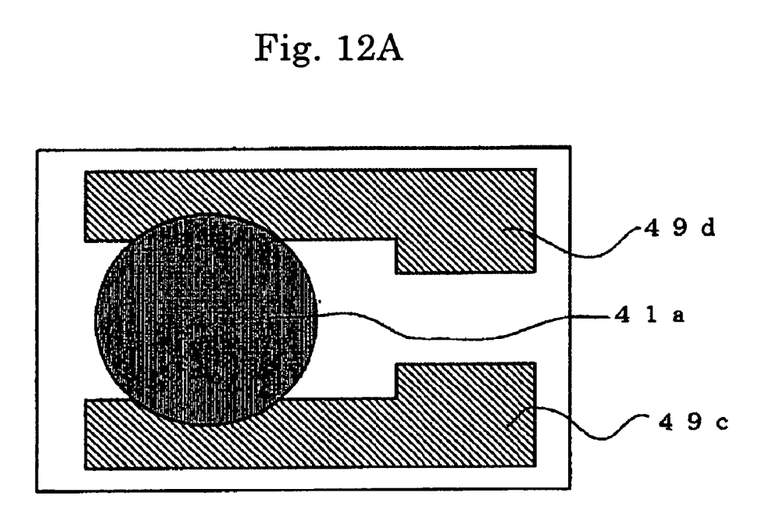
FIGS. 12A to 12C are diagrams illustrating electrode patterns showing modifications of an electric heating element according to the present invention.
Figure 12B:
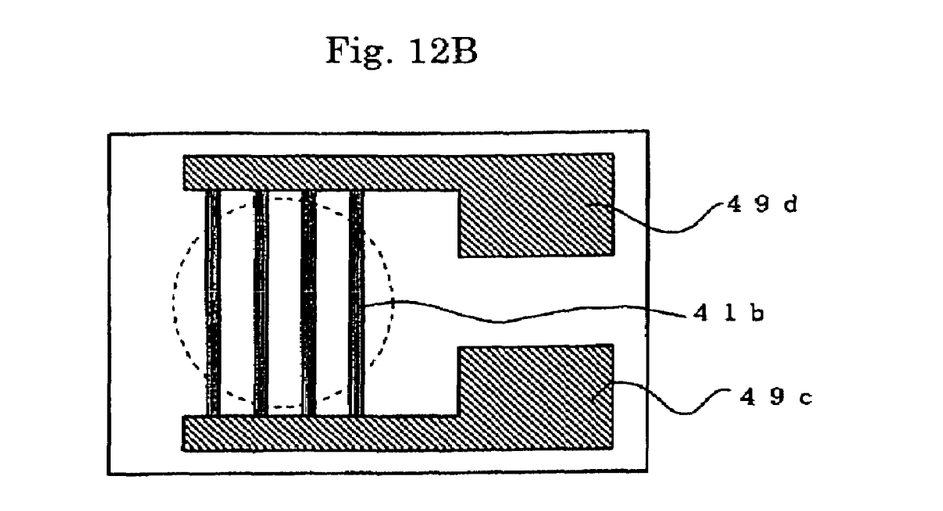
Figure 12C:
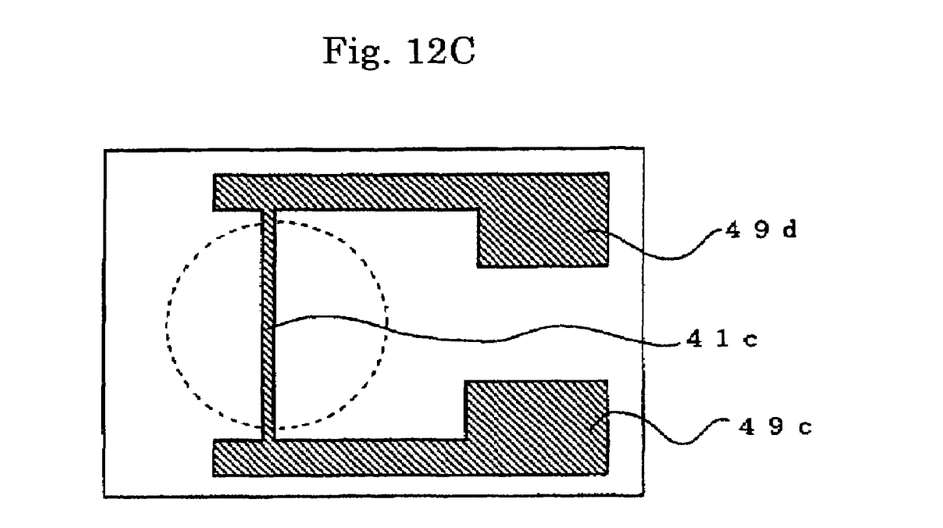

FIGS. 12A to 12C illustrate modifications of the electric heating element shown in FIG. 11. The electric heating element 41a shown in FIG. 12A is a transparent electric heating element of ITO or the like formed over the entire lens area. The electric heating element 41b shown in FIG. 12B is a transparent electric heating element of ITO or the like formed across the lens area (dotted-line circle) in a plurality of line patterns. The electric heating element 41c shown in FIG. 12C is an opaque electric heating element of gold or the like formed across the lens area in a thin line pattern. The electric heating element 41c has a line width of several microns to minimize the light transmission loss in the lens area.

These electric heating elements allow the concentric electrode assembly 8 and the electric heating element 41 to be formed on different sides of the first substrate 45. Accordingly, their pattern formation and the layout of the connecting terminals can be performed with a high degree of freedom. Thus, the electric heating elements are advantageous from the viewpoint of structure and cost.

According to the present invention, the liquid crystal lens is provided with an electric heating element to compensate for a delay in operation at low temperature as stated above. Therefore, it is possible to realize a liquid crystal lens device having a wide focusing range and responding at high speed. In a liquid crystal lens having a two-layer structure, an electric heating element is provided only in one of two liquid crystal lens parts, thereby making a liquid crystal lens simple in structure and advantageous in terms of cost.

In addition, forming the electric heating element from ITO portions and gold portions increases the degree of freedom for the configuration and positioning of the heating part of the electric heating element. By forming the electric heating element by the method disclosed in Japanese Patent Application Publication No. Hei 11-194358, stability of the electrodes can be obtained, and a reduction in costs can be expected.

Although in the foregoing example the electric heating element is formed on a surface of the substrate on the side thereof closer to the liquid crystal, it is also possible to provide the electric heating element on the side of the substrate remote from the liquid crystal.

The liquid crystal lens device according to the present invention is not necessarily limited to the camera shown in the embodiments but may be applied, for example, to optical disk pickup devices, medical equipment such as endoscopes, and eyeglass diopter adjustment.

It should be noted that the present invention is not necessarily limited to the foregoing embodiments but can be modified in a variety of ways without departing from the gist of the present invention.

What is claimed is:

1. A liquid crystal lens comprising a first liquid crystal lens part which comprises:
    a first substrate having a first light-transmitting region;
    a second substrate having a second light-transmitting region opposed to said first light-transmitting region;
    a first liquid crystal filled between said first and second light-transmitting regions;
    first and second electrodes provided on said first and second substrates, respectively, to apply a voltage across said first liquid crystal between said first and second substrates; and
    an electric heating element provided on said first substrate to heat said first liquid crystal, wherein said electric heating element is an opaque element that is positioned outside said first light-transmitting region of said first substrate.

2. A liquid crystal lens according to claim 1, wherein said electric heating element is provided on a surface of said first substrate facing said first liquid crystal.

3. A liquid crystal lens comprising a first liquid crystal lens part which comprises:
    a first substrate having a first light-transmitting region;
    a second substrate having a second light-transmitting region opposed to said first light-transmitting region;
    a first liquid crystal filled between said first and second light-transmitting regions;
    first and second electrodes provided on said first and second substrates, respectively, to apply a voltage across said first liquid crystal between said first and second substrates;
    an electric heating element provided on said first substrate to heat said first liquid crystal; and
    a second liquid crystal lens part which comprises:
        a third substrate having a third light-transmitting region opposed to said first light-transmitting region;
        a fourth substrate disposed at a side of said third substrate remote from said first substrate, said fourth substrate having a fourth light-transmitting region opposed to said third light-transmitting region; a second liquid crystal filled between said third and fourth light-transmitting regions; and
        third and fourth electrodes provided on said third and fourth substrates, respectively, to apply a voltage across said second liquid crystal; wherein said first and second liquid crystal lens parts are disposed so that respective orientations of said first and second liquid crystals are orthogonal to each other.

4. A liquid crystal lens according to claim 3, wherein said electric heating element is an opaque element that is positioned outside said first light-transmitting region of said first substrate.

5. A liquid crystal lens according to claim 3, wherein said first substrate and third substrate are bonded together with an adhesive.

6. A liquid crystal lens according to claim 3, further comprising an electric heating element provided on said third substrate to heat said second liquid crystal.

7. A liquid crystal lens according to claim 3, wherein said first substrate has a first extension portion extending outward relative to said second substrate, and at least one of a connecting terminal for external connection of said electric heating element and a connecting terminal for external connection of said first electrode is provided on an outer surface of said first extension portion.

8. A liquid crystal lens according to claim 7, wherein said third substrate has a second extension portion extending outward relative to said fourth substrate, and a connecting terminal for external connection of said third electrode is provided on an outer surface of said second extension portion.

9. An optical device comprising: a housing having an aperture for receiving incident light; and said liquid crystal lens of claim 3, said liquid crystal lens being set in an optical system along an optical axis extending into said housing through said aperture of said housing; wherein said second liquid crystal lens part and first liquid crystal lens part are disposed along said optical axis so that said fourth substrate is positioned to face said aperture.

* * * * *